Oct. 30, 1928.
A. R. WALKER
1,689,265
CORN POPPING AND VENDING APPARATUS
Filed Nov. 19, 1923    2 Sheets-Sheet 2
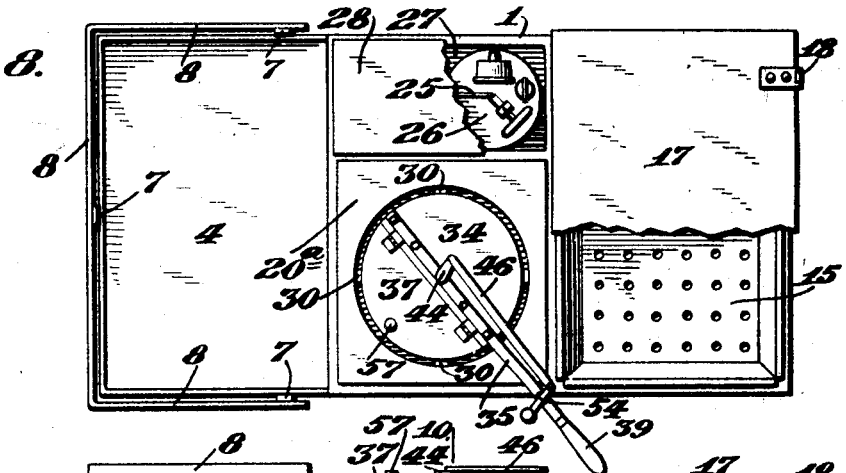
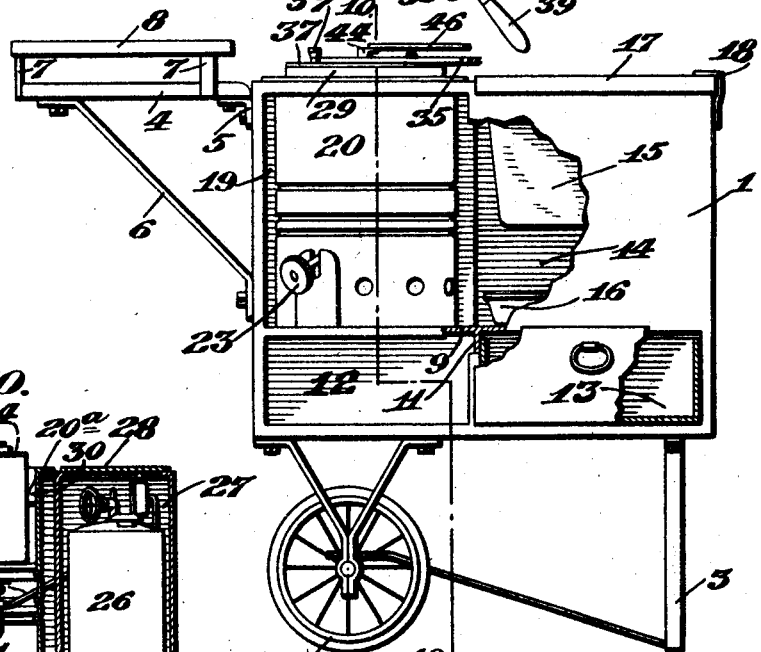
Inventor:
Albert R. Walker,
By George A. Pennington
his Atty.

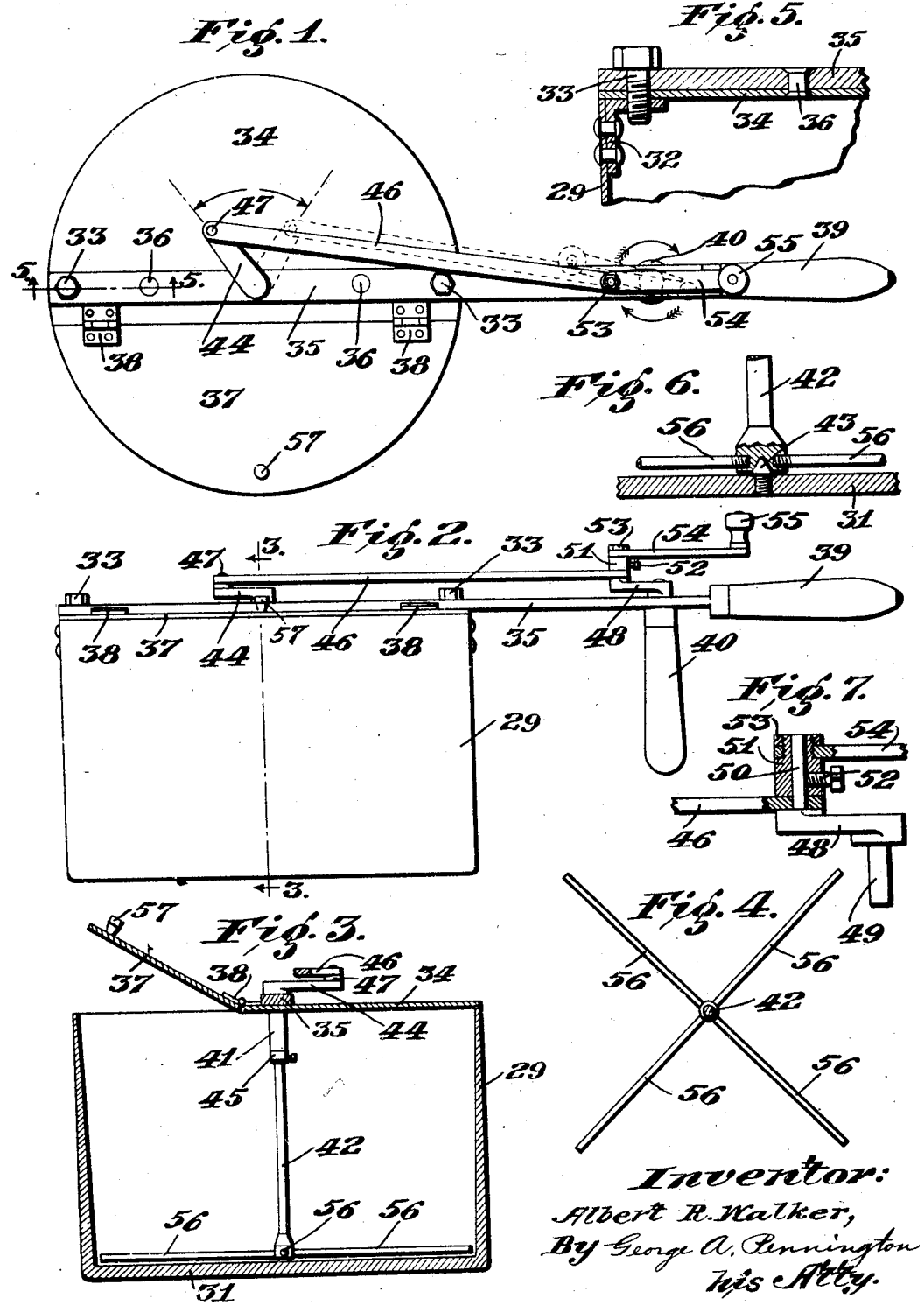

Patented Oct. 30, 1928.

1,689,265

UNITED STATES PATENT OFFICE.

ALBERT R. WALKER, OF ST. LOUIS, MISSOURI.

CORN POPPING AND VENDING APPARATUS.

Application filed November 19, 1923. Serial No. 675,564.

This invention relates to a corn popping and vending apparatus, and more particularly to such of the portable type.

It has for its objects to produce a simple, easily manipulated and controlled outfit in a convenient and sanitary arrangement, of neat and attractive appearance, and capable of both indoor and outdoor use; to produce an improved stove and popping kettle that will quickly and thoroughly pop or puff the corn and yield practically a full percentage of full flavored and palatable product; and to attain other advantages as will appear in the following description.

The invention consists in the novel construction, combination and arrangement of cooking and vending stand, and also in the separate novel features of the stove and the corn popping kettle, all as hereinafter described and afterward pointed out with particularity in the appended claims.

In the accompanying drawings illustrating a practical embodiment of the invention,—

Figure 1 is a top plan view of the kettle detached from the apparatus;

Figure 2 is a side elevation thereof;

Figure 3 is a cross section taken substantially on the line 3—3 of Figure 2;

Figure 4 is a detail view of the agitator spider;

Figure 5 is a fragmentary section, on an enlarged scale, on the line 5—5 of Figure 1, showing how the handle and cover are attached to the kettle;

Figure 6 is a fragmentary section of the bottom of the kettle and the adjacent end portion of the agitator spindle, showing the center bearing for the latter;

Figure 7 is a fragmentary view of the operating crank handle for the agitator;

Figure 8 is a top plan view of the complete portable stand, parts being broken away to show the interior arrangements;

Figure 9 is an elevation of the operator's side of the stand, parts being broken away and shown in section, to show the interior arrangements; and Figure 10 is a cross section through the stand, taken on or about the line 10—10 of Figure 9.

Referring now to the drawings, the numeral 1 designates generally the body of the stand, which, as shown, is a rectangular, box-like, compartment housing constructed, preferably, of sheet metal and suitably reinforced at its corners by framing, not shown, but perfectly obvious or according to any approved or well known practice.

At one end the housing is mounted on wheels 2, and at the opposite end there is a suitable foot-frame or supporting leg or standard 3, while at the end of the housing where the wheels 2 are located thereunder, and in a plane just a little below the top of the housing, a shelf 4 is attached, as at 5, and suitably braced by diagonal stays 6.

Extending about the side and outer end margins of the shelf 4 and supported at a slight elevation thereabove by upright brackets 7 is a rail 8 which, in addition to affording a retaining guard for utensils, packages or other articles on the shelf, serves as a handle for propelling the stand, which is readily accomplished by tipping the stand slightly on the wheels 2 so as to lift the support 3 off the ground and then rolling the stand on the wheels 2 the same as with an ordinary push-cart.

Extending entirely across from end to end and side to side of the housing 1 is a false bottom 9, the space between which and the bottom proper 10 being divided approximately in half by a partition 11, affording an open-ended compartment 12 on the one side for storage of wrapping paper, bags, cartons, etc., while on the other side a drawer 13 is provided as a receptacle for the supply of shelled and unpopped corn.

Above the drawer compartment is a chamber 14, open at the top for the reception of a deep pan or tray 15 for the popped corn. The tray 15 preferably has a foraminous or reticular bottom, the perforations, or open mesh in case wire fabric is used, being small enough, of course, to retain the popped corn and yet sufficiently large to sift out the small crumbled particles and unpopped grains of corn.

The offal from the tray 15 is caught in a tray 16 placed for the purpose thereunder on the false bottom 9.

A cover 17 is provided for the chamber 14 and it is conveniently hinged, as at 18, to the end wall of the housing so that it may be either swung over and dropped down against the end wall or propped up in horizontal position to afford a convenient shelf, as desired.

Above the compartment 12 is a compartment 19 open at the front side towards the operator and also open to communication with the chamber 14. In this compartment 19 is a stove comprising a cylindrical shell 20 resting on the false bottom 9 and being open at its top and having a rectangular flange 20ª surrounding said top opening and affording a cover for the compartment 19.

In the lower part of the shell 20 is a suitable oil or gas burner 21, preferably a pressure gasolene vapor burner. As shown, conventionally, the burner is supported on a standard 22 resting on the false bottom 9, and its manipulating handle or knob 23 for the regulating valve 24 is located outside the shell 20 within convenient reach of the operator.

The burner is supplied with fuel through the usual, regulation, small tube 25 from a pressure supply tank 26 located in a closed compartment 27 back of the compartment 19. Preferably, the walls of the compartment 27 are lined with suitable asbestos or other insulating material, not shown, but perfectly obvious, and a removable cover 28 is provided so that access may be had to the compartment at will.

In the shell 20 of the stove, above the burner, is a spider or other suitable supporting arrangement for the corn popping kettle 29, which latter is smaller in diameter than the interior diameter of the shell and is spaced concentrically therein by lugs or bracket members 30 provided for the purpose on the inner face of the shell. By this arrangement the heated air from beneath the kettle circulates up through the annular space all around the kettle, and the kettle is free to rotation through the medium of the handle to be presently described.

The kettle 29, which is preferably constructed of a suitable aluminum alloy, has a relatively thick bottom 31 and its annular wall tapers gradually upward to a thinner edge as shown more clearly in Figure 3. At diametrically opposite points angle brackets 32 are secured on the inside of the kettle (see Figure 5) and provided with screw-threaded apertures in their horizontal flanges for the reception of screw-bolts 33 by which the cover 34 is detachably secured to the kettle.

As shown, the cover 34 has a handle bar 35 riveted, bolted, or otherwise fastened thereon, as at 36 (see Figures 1 and 5). This handle bar extends diametrically across the top of the cover and it is provided with apertures for the passage of the screw-bolts 33 into the lugs or brackets 32. By this arrangement, the cover may be readily removed and replaced, at will, when it is desired or necessary to clean the inside of the kettle, by merely removing and replacing said screw-bolts 33. The cover also has a hinged portion 37, the line of separation extending parallel and adjacent to the handle bar and the hinges 38 being preferably riveted on the outer face of the cover proper and said hinged portion, as shown.

At the outer end of the handle bar is a handle or hand grip 39, while depending from the bar adjacent to said handle 39 is a second handle 40. The relative and correlated angular arrangement of the two handles is such that the kettle is conveniently manipulated under all conditions, for rotating the kettle on its supports in the stove shell, actuating the agitator as will be presently described, and for removing the kettle from the stove and dumping its contents into the receptacle 15 for the popped corn. That is to say the operator may grasp the handle 39 with one hand and the handle 40 with his other hand in the handling and manipulation of the kettle.

Extending through a central bearing 41 depending from the cover 34 is a spindle 42 whose lower end terminates in close proximity to the bottom of the kettle, and, preferably, has a tapered socket in its end to receive a cone-shaped bearing stud 43 which is screwed or riveted in the bottom of the kettle (see Figure 6).

On the upper end of the spindle 42, outside the cover 34, is fastened an arm 44 which rests on the handle bar 35 so as to support the spindle as well as rotate it. To prevent the spindle from lifting out of place a collar 45 is secured thereon and abutting the lower end of the bearing 41.

The arm 44 has a link or connecting rod 46 hinged thereto, as at 47, the opposite end of the link being hinged to a crank arm 48, which latter is shorter than the arm 44, so that, when the crank arm is rotated in a complete circle the arm 44 is not completely rotated, but is oscillated back and forth.

The crank arm 48 has its pivot stud 49 suitably journalled in the handle bar axially of the handle 40. It has an upstanding stud 50 on which the link or connecting rod 46 is pivoted, and above which latter a collar 51 is fastened tight by a set-screw 52. The upper end of the collar is reduced in diameter and screw-threaded, and fastened tight thereon, by a nut 53, is a supplemental arm 54 much longer in length than said arm 48 and having a knob 55 at its free end. This is to give a greater leverage to the driving crank to facilitate its operation by the operator.

At the lower end of the spindle 42 is a spider 56 whose arms sweep over the bottom of the kettle in very close proximity thereto without scraping, but close enough to engage the grains of corn and roll them as the spider is rotated. There may be any desirable number of arms to the spider, but it has been found practical to provide four as shown, and in which case, the relative throws of the rock arm 44 and crank arm 48 are so proportioned that the spider arms oscillate through an angle of approximately ninety degrees and preferably a little over so that all the grains of corn on the bottom of the kettle are thoroughly rolled and sufficiently agitated to prevent scorching and insure more perfect puffing or flowering of the popped corn. Obviously, therefore, the angle of oscillation will be governed principally by the number and angularity of the spider arms of the agitator.

A better and more perfect yield of popped corn is also afforded by having the bottom of the kettle relatively thick and its annular side wall tapered upward. This feature, in conjunction with the annular space between the kettle and cylindrical shell 20 of the stove, so that the confined heated air is compelled to pass all around the kettle, and the action of the agitator spider oscillating back and forth, instead of continuously rotating in one direction, and thereby more assuredly rolling the grains of corn, produces a superior and more palatable product. Furthermore, all the natural flavor is retained in the popped corn when produced in a closed kettle, much more so than in open popping devices.

The arrangement of the portable stand as herein set forth is convenient and sanitary, as well as being attractive and inviting in appearance. So, too, the stove compartment 19 being open to communication with the chamber 14, a certain amount of heat is circulated therefrom into the latter so as to keep the contents of the receptacle 15 warm.

The hinged portion 37 of the cover 34 readily swings open when the kettle is tipped as may be conveniently accomplished by holding the handle 39 with one hand and the handle 40 with the other hand when it is desired to dump out the contents. The hinged cover section is also provided with a suitable handle or knob 57 for convenience in raising it to inspect the contents of the kettle.

Obviously the entire apparatus admits of considerable modification and alteration within the spirit of the invention as defined by the appended claims. It is, therefore, not limited to the specific constructions and arrangements shown in the drawings.

What is claimed is:

1. In a corn popper, a stove comprising a cylindrical shell having a heating element in the lower portion thereof, a supporting spider above said heating element, a series of inwardly projecting spacing elements arranged annularly on the inner face of said shell above said supporting spider, and a kettle rotatably seated on said supporting spider and between said spacing elements in concentric spaced relation to said shell.

2. In a corn popper, a stove comprising a cylindrical shell having a fuel burner in the lower portion thereof, said shell having a supporting spider above said burner, and inwardly projecting correlated spacing elements above said supporting spider, a kettle seatable on said support and being rotatable between said spacing elements in concentric spaced relation to said shell, the top of said kettle being in a plane above the top of said shell, a handle extending diametrically from the top of said kettle, an agitator in said kettle, and means on said handle for actuating said agitator.

3. The herein described corn popping and vending apparatus, comprising a rectangular body housing mounted at one end on ground wheels and having a foot element at its opposite end in supporting correlation to said ground wheels, said body housing having a false bottom above the bottom proper, the space therebetween being divided by a central transverse vertical partition affording parallel adjoining storage compartments which are open-ended at the operator's working side of the housing, a drawer fitted in one of said compartments, said body housing above said false bottom being divided by a central transverse vertical partition extending from the top of the housing downward with its bottom edge terminating a short distance above said false bottom whereby to provide two separate but intercommunicating upper compartments which are disposed one above each of said first mentioned lower storage compartments, the upper compartment at the end of the body housing beneath which the said foot element is located having a foraminous tray supported in its upper portion for the reception of the popped corn and an offal tray removably supported on said false bottom below said foraminous tray, a plate hinged to the upper edge portion of the end wall of the body housing and affording a closure for the adjacent upper compartment last above mentioned and also constituting a shelf extension of the housing when supported horizontally in open condition, the other upper compartment beneath which the ground wheels are located having a longitudinal vertical partition subdividing it into a closed fuel storage compartment at the far side of the body housing and a stove-containing compartment at the operator's working side of the housing, said stove-containing compartment being open at the operator's working side thereof and said fuel storage compartment being provided with a removable top closure, a cylindrical stove shell located within said stove-containing compartment, said shell resting on the false bottom of the body housing and being open at its top, the upper end of said shell having a flat rectangular flange affording a top closure for said stove-containing compartment, a fuel burner in the lower portion of said stove shell, a corn popping kettle supported rotatably and concentrically within the upper portion of said stove shell and being spaced annularly from the wall thereof, a shelf rigidly fixed to the wall at the end of said body housing under which the ground wheels are located, said shelf being located substantially in the horizontal plane of the top of the housing, and upstanding guard rails fixedly secured on the outer end and side marginal portions of said fixed shelf, said guard rails constituting an article-retaining rack and handle for manipulating and propelling said body housing on its ground wheels.

ALBERT R. WALKER.